(12) United States Patent
Nilsen et al.

(10) Patent No.: US 10,801,874 B2
(45) Date of Patent: Oct. 13, 2020

(54) FULLY ADJUSTABLE LIQUID TANK FLOAT

(71) Applicants: Paul A. Nilsen, University, MO (US); Dominick Paradiso, Charlottesville, VA (US)

(72) Inventors: Paul A. Nilsen, University, MO (US); Dominick Paradiso, Charlottesville, VA (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 13/986,318

(22) Filed: Apr. 19, 2013

(65) Prior Publication Data

US 2013/0276534 A1    Oct. 24, 2013

Related U.S. Application Data

(60) Provisional application No. 61/687,252, filed on Apr. 23, 2012.

(51) Int. Cl.
*G01F 23/34* (2006.01)
*G01F 23/32* (2006.01)

(52) U.S. Cl.
CPC .............. *G01F 23/32* (2013.01); *G01F 23/34* (2013.01)

(58) Field of Classification Search
CPC .......... G01F 23/32; G01F 23/34; G01F 23/42; G01F 23/50; G01F 23/58; G01F 23/66
USPC .......................................................... 73/318
See application file for complete search history.

(56) References Cited

U.S. PATENT DOCUMENTS

| | | | | |
|---|---|---|---|---|
| 1,112,522 A | * | 10/1914 | Getti | G01F 23/34 73/318 |
| 1,224,713 A | * | 5/1917 | Cole | G01F 23/34 73/318 |
| 1,272,882 A | * | 7/1918 | Adams | G01F 23/34 73/318 |
| 1,355,939 A | * | 10/1920 | Cole | G01F 23/34 73/318 |
| 1,363,982 A | * | 12/1920 | Jones et al. | G01F 23/34 73/321 |
| 1,381,285 A | * | 6/1921 | Cox | G01F 23/34 73/318 |
| 1,396,655 A | * | 11/1921 | Newton | G01F 23/34 73/318 |
| 1,425,116 A | * | 8/1922 | Lundin | G01F 23/34 73/314 |
| 1,432,385 A | * | 10/1922 | Conners | G01F 23/34 73/307 |
| 1,442,168 A | * | 1/1923 | Metzger | G01F 23/34 73/318 |

(Continued)

*Primary Examiner* — Alexander A Mercado
(74) *Attorney, Agent, or Firm* — Paul M. Denk

(57) ABSTRACT

A fully adjustable liquid tank float incorporates a float for use for gauging the amount of fuel or other liquid contained within a storage tank, the float being connectable to an adjustable lateral arm, which pivotally connects to a vertical structure, which secures to an adaptor that is mounted onto the top of the storage tank. The adaptor connects a transparent housing, which discloses an indicator of the amount of fuel remaining in the tank. The vertical structure is likewise adjustable in length. A flexible linkage connects with the indicator, and is adjustably secured with the lateral arm, to provide for a precise indication as to when the tank is full, partially full, or approaching empty.

10 Claims, 2 Drawing Sheets

(56) References Cited

U.S. PATENT DOCUMENTS

| | | | | |
|---|---|---|---|---|
| 1,523,168 A * | 1/1925 | Cole | G01F 23/34 | 73/318 |
| 1,607,645 A * | 11/1926 | Schulte | B60K 15/061 | 73/318 |
| 1,629,994 A * | 5/1927 | Cooper | G01F 23/34 | 73/318 |
| 1,658,235 A * | 2/1928 | Frank | B60K 15/061 | 73/318 |
| 2,240,669 A * | 5/1941 | Russo | G01F 23/34 | 116/229 |
| 2,289,294 A * | 7/1942 | Phaneuf | G01F 23/34 | 73/318 |
| 2,316,377 A * | 4/1943 | Wilhelm | G01F 23/34 | 73/317 |
| 2,349,092 A * | 5/1944 | Hammer | A47D 1/103 | 297/256 |
| 2,350,042 A * | 5/1944 | Jurs | G01F 23/34 | 73/318 |
| 2,446,844 A * | 8/1948 | Molaver | G01F 23/34 | 73/317 |
| 2,580,057 A * | 12/1951 | Wilhelm | G01F 23/34 | 73/317 |
| 2,651,200 A * | 9/1953 | Colburn | G01F 23/34 | 73/317 |
| 2,797,577 A * | 7/1957 | Wilhelm | G01F 23/34 | 73/318 |
| 2,987,916 A * | 6/1961 | Wilhelm | G01F 23/34 | 73/317 |
| 3,320,922 A * | 5/1967 | Taylor | G01F 23/34 | 116/229 |
| 3,339,413 A * | 9/1967 | Taylor | G01F 23/34 | 73/317 |
| 3,339,519 A * | 9/1967 | Taylor | G01F 23/34 | 116/229 |
| 3,537,313 A * | 11/1970 | Schorsch | G01F 23/34 | 73/318 |
| 3,638,493 A * | 2/1972 | Schoepflin | G01F 23/34 | 73/317 |
| RE27,767 E * | 10/1973 | Schoepflin | G01F 23/34 | 73/318 |
| 3,880,109 A * | 4/1975 | Festa | G01F 23/34 | 116/229 |
| 4,036,055 A * | 7/1977 | Engelhardt | G01F 23/34 | 73/312 |
| 4,081,639 A | 3/1978 | Tice | | |
| 4,147,060 A * | 4/1979 | Fling | G01F 23/42 | 73/318 |
| 4,398,186 A * | 8/1983 | Statz | E03F 7/00 | 200/84 R |
| 4,402,209 A | 9/1983 | Di Domenico | | |
| 4,988,978 A | 1/1991 | Soto | | |
| 5,006,834 A * | 4/1991 | Fountain | G01F 23/32 | 116/229 |
| 5,089,676 A | 2/1992 | Duncan | | |
| 5,845,676 A | 12/1998 | Gothesen | | |
| 5,900,546 A | 5/1999 | Wilkins | | |
| 6,089,086 A * | 7/2000 | Swindler | G01F 23/38 | 73/305 |
| 6,167,756 B1 | 1/2001 | Everson, Jr. et al. | | |
| 6,513,378 B1 | 2/2003 | Love, Jr. | | |
| 6,988,406 B1 | 1/2006 | Mack | | |
| 7,377,162 B2 | 5/2008 | Lazaris | | |
| 7,954,666 B2 | 6/2011 | Webster et al. | | |
| 8,283,647 B2 | 10/2012 | Shamir et al. | | |
| 2003/0106371 A1* | 6/2003 | Housey | G01F 23/34 | 73/317 |

\* cited by examiner

FULLY ADJUSTABLE LIQUID TANK FLOAT

CROSS REFERENCE TO RELATED APPLICATION

This non-provisional patent application claims priority to the provisional patent application having Ser. No. 61/687,252, filed on Apr. 23, 2012.

FIELD OF THE INVENTION

This invention relates to a fully adjustable float for use in providing a gauge as to the extent of liquid remaining in a tank, such as a fuel tank that may hold gasoline, oil, or other liquids.

BACKGROUND OF THE INVENTION

This invention relates to a liquid tank float, one that is provided for furnishing a clear observance of the amount of liquid remaining within a tank, whether it be full to capacity, or its contents have been depleted through consumption, to provide a ready indication to the building or business owner as to how much, for example, of fuel may remain stored within the tank in which the float is installed.

Numerous types of floats have been readily available for use upon, for example, home or industrial building oil tanks, where the oil may be used for fuel for heating or for other operations of the building. Such tanks may also be used in industrial applications, and it is essential that the workers have a clear indication as to how much fuel remains in the tank, and when it may need to be replenished, so as to prevent any disruption in the operations of the plant, and the functioning of the plant machinery. In addition, the concept of this invention may be used, to a lesser extent, even upon residential type of storage tanks, as for heating oil, so as to let the owner know when fuel must be reordered, so as not to run out during frigid weather conditions, as can be understood.

Various types of floats have been available on the market. Generally, they include an upper indicator, generally identified as a jarhead, which engages onto the upper surface of the fuel tank or vessel. Usually these indicators are made of transparent material, either transparent polymer, or glass, and are threadily engaged through an adaptor to the upper wall of the fuel tank, so as to be readily seen by those with the authority to know how much fuel remains, and when reordering must be done, to replenish and restock the liquid fuel. Normally, this type of fuel may be heating oil, could be gasoline, kerosene, or the float could be used with any type of liquid, that is stored, gradually consumed, and requires constant supervision to determine the accurate amount of liquid remaining, so that reordering can be done on a timely note.

These types of prior art floats usually have a float contained therein, which float will rise or lower depending upon the amount of liquid remaining within the storage tank. Normally, a structured rod connects with the adaptor for the float, and rigidly extends downwardly within the tank, to somewhere around its midpoint, and has pivotally connected thereto another structured rod, that extends laterally, but is capable of pivoting upwardly, or downwardly, within the storage tank. At the end of the lateral rod is a float, normally one that contains a capacity of sealed air, or a vacuum, and that float is capable of riding upon the surface of any fuel remaining in the tank, and thereby, pivot the lateral arm upwardly, or downwardly, depending upon the amount of fuel remaining in the tank. In addition, there is an indicator provided within the clear vessel that mounts to the top wall of the storage tank, and within that vessel is an indicator, that is capable of shifting upwardly, or downwardly and therein provides an indication as to the amount of fuel remaining in the tank. There may be indicia provided either upon the indicator, or upon the transparent vessel, and these indications may provide a quick reading as to whether the tank is full, three quarters full, half full, one fourth full, or is approximating empty. This can be done through either indicia provided upon the transparent vessel, or upon the indicator located therein, and thereby cooperate between the two to provide a ready indication as to the capacity of the tank, at any time of reading. Normally, the prior art devices included through a rigid rod that would connect with the indicator, and extend downwardly somewhat parallel to the vertical structured rod, of the float, and this rigid rod connects with the lateral pivot arm, displaced a fixed distance from the point of its pivot with the vertical rod, and through this relationship, when the lateral arm, with its float, either rises within the storage tank, or lowers therein, as fuel is being depleted, the structured indicator arm would shift slightly upwardly, or downwardly, depending upon the movement of the lateral arm float, to thereby shift the indicator within the transparent vessel either up or down therein, to provide an approximate reading as to the amount of fuel yet remaining within the storage tank.

For all practical purposes, these prior art types of floats where reasonably successful in operation, would provide a rough estimation as to the amount of fuel remaining, but one of their drawbacks is that they were just not adjustable, in order to provide a more precise setting for the float, and the indicator, so as to allow the installer to adjust it at the site of its installation, within the fuel tank, to furnish a very accurate reading of the amount of fuel remaining, regardless in what type of fuel tank the float is installed, unlike the floats of the prior art.

Examples of these rigid structural rods like floats or monitors have been made available upon the market by a Company called BJ Enterprises, of Pacific, Mo. In addition, a Company called Krueger Corporation also supplies related type of structured liquid level monitors.

The current invention is designed to improve upon the precision setting that can be given to a monitor or float, so that it can be set at the site of its installation, to work accurately for the storage tank in which it is installed.

SUMMARY OF THE INVENTION

The principle of this invention is to provide a fully adjustable liquid tank float that can provide more precise readings and measurements as to the quantity and capacity of liquid, such as a fuel, remaining within a storage tank. The essence of this invention is its adjustability, and its attributes, over what has been provided in the prior art, that can be summarized in three categories.
1. The concept for the product of this invention is to provide the ability to adjust to monitor the liquid level in storage tanks more accurately;
2. The product, structurally, utilizes telescoping rods and tubes to extend or shorten the linkages for the float, so that it can be used in different sized storage tanks, when installed; and
3. The product also adapts, for the first time, a non-rigid form of linkage to connect the visual indicator to the pivoting lateral float arm, thereby transmitting the location of the float, to the indicator, to provide a more precise reading as to the remaining capacity of the fuel tank, during usage.

The structural essence of this invention includes an indicator and its transparent cover that mounts by means of an adaptor generally along the top wall of the storage tank. Extending downwardly from the adaptor is a vertical support rod, but to add to the dexterity of this structure, the support rod is telescopically formed to allow for its fine adjustment, vertically, so that it can be adjusted to provide for its installation within fuel tanks of differing capacities, which means that this float, and its ability to monitor the level of fluid remaining within the tank, can be adjusted, on site, as it is installed for usage. In addition, a lateral support arm pivotally connects to the vertical structure, and the pivotal arm likewise is adjustable in its setting upon the vertical support, so that it can be raised, or lowered, when seeking the midpoint of capacity of the storage tank, as it is installed for usage. In addition, the pivotal lateral arm likewise is telescopically formed, so it can be shifted further laterally, in its length, or shortened, again depending upon the capacity and size of the fuel tank in which the float is mounted. In addition, the indicator within the transparent housing is spring biased into a steady state position, so that when the fuel tank is half filled, or when it has been depleted of half of its capacity, the indicator will provide for readout of one half, indicating that the fuel tank maintains only half of its capacity. When the fuel tank is filled, the indicator rises to the top of the housing, to provide an indication that the fuel tank is full, having been filled to capacity. In addition, when the float within the tank pivots its lateral arm downwardly, to the bottom of the tank, the indicator will provide for a readout that the tank is approaching empty, or is empty, and needs to be replenished by the fuel supplier. But, unlike prior monitors, the rod upon which the indicator mounts extends through the adaptor, and into the tank. It has connected to its bottom end a flexible linkage, in the preferred embodiment, a ball and chain type of linkage, which is non-rigid, extends down to its interconnection with the lateral arm, spaced a short distance away from the vertical support rod, as can be noted. Thus, a flexible linkage of this type can be connected to the lateral arm, but at the same time, its connecting pivot can be adjusted, so that the chain can be shortened, or lengthened, in its connection between the indicator rod, and the lateral arm, to provide for a more fine setting in the indications received from this monitor, as it is being installed and used. This can all be adjusted, and fine tuned, at the site of its installation.

It is, therefore, the principal object of this invention to provide for a fully adjustable liquid tank float, for use for monitoring the remaining amounts of fuel, heating oil, or other liquids within a storage tank.

Another object of this invention is to provide an indicator that is able to be adjusted to monitor the liquid level in storage tanks more accurately.

A further object of this invention is to provide for the usage of telescoping rods and tubes to provide for the extension or shortening of the various linkages, fabricated into the liquid level indicator of this invention.

Yet another object of this invention is to provide a monitor that uses non-rigid linkages to connect the visual indicator to the pivoting lateral float arm of this invention.

A further object of this invention is to provide a float indicator that is fully adjustable, through the use of interconnecting telescoping rods and tubs, forming the vertical support, the lateral float arm, and the linkage that interconnects between the indicator, and the horizontal arm, in its structure.

Still another object of this invention is to provide a monitor that can be easily adjusted and fine tuned just before it is assembled and installed into a fuel storage tank.

Yet another object of this invention is to provide an indicator float that can be easily installed by determining the midpoint of the height of any liquid stored within its fuel tank, adjust the indicator and its float to that half storage level, just prior to its installation, so that the indicator can then provide a readout as to when the fuel storage tank is full, half full, or approaching empty.

These and other objects may become more apparent to those skilled in the art upon review of the summary of the invention as provided herein, and upon undertaking a study of the description of its preferred embodiment, in view of the drawings.

DESCRIPTION OF THE PREFERRED EMBODIMENT

Figure 2:
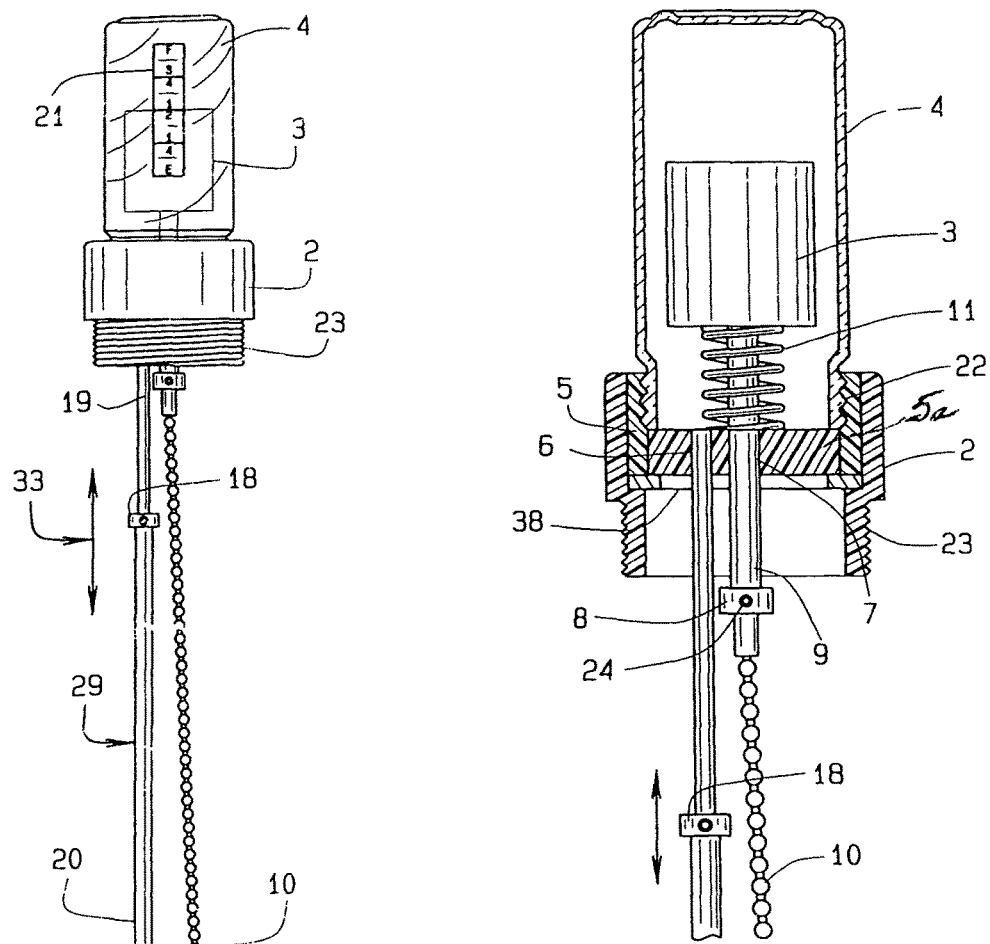
FIG. 2 is a sectional view of the upper portion of the tank float as disclosed in FIG. 1.
Figure 1:
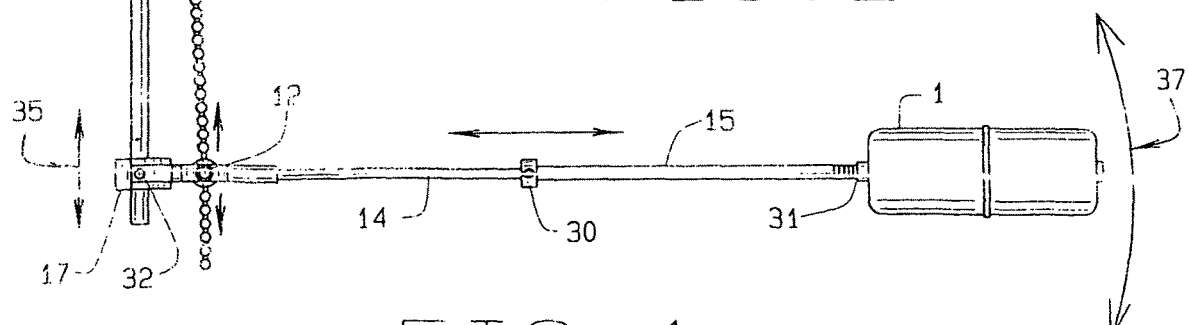
FIG. 1 provides a front view of a fully installed adjustable liquid level tank float, showing its float arm arranged laterally, for providing a readout that the fuel tank in which it is installed is at one-half capacity.
Figure 3:
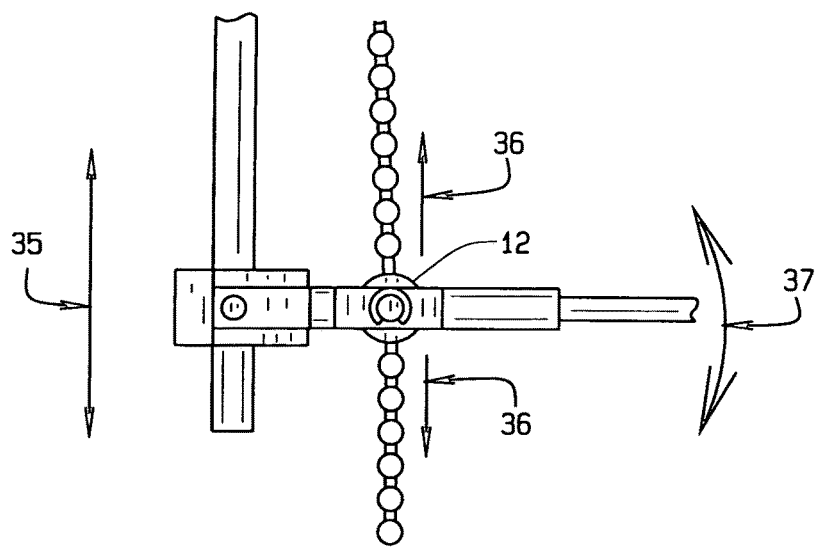
FIG. 3 shows the interconnection between the pivotal lateral float arm to the vertical rod for the float, and disclosing the connection of the flexible linkage to the said lateral float arm.

In referring to the drawings, and in particular FIGS. 1 and 2, the structure of this fully adjustable liquid tank float monitoring device is readily disclosed. As can be seen, it includes a float 1 that is arranged along the various structural rods of the device, which generally connect with an adaptor 2, and which provides the means for supporting the visual indicator 3 within the transparent housing, as at 4, generally described as a jarhead, for holding the indicator in place, and to mount the various indicia, as at 21, which provides an indication, along with the top of the indicator 3, as to whether any liquid stored within the tank, in which this indicator mounts, may be full, or to empty, or at any degree therebetween, as can be determined. Generally, as can be seen, the adaptor 2 is provided with threads, as at 22, for providing means for threadedly engaging with the housing 4, as it is assembled. Furthermore, the adaptor includes a series of lower threads 23 that are provided for threadedly engaging into the top of the fuel storage tank, as can be understood. This is all done during the assembly of the float for usage.

It is in the insert 5 that threadily engages with the threaded bottom 22 of the housing or jarhead 4.

Contained within the insert 5 is a base plate 5a formed as having a structural washer 38, and the washer 38 is rigidly secured below the insert, by any adhesive, or the like, during its assembly. The base plate 5a has an aperture provided therethrough, as at 7, and it functions as a locator for holding the rod 9 therethrough, and which rod secures with the indicator 3, and is generally positioned approximately centrally within the housing 4, by means of the spring 11. Thus, when the fuel storage tank (not shown) is half full, the float 1 will be at its horizontal position, as noted in FIG. 1, and the top of the indicator 3 will be at the one-half mark of the indicia 21, shown that the tank is half filled.

Figure 4:
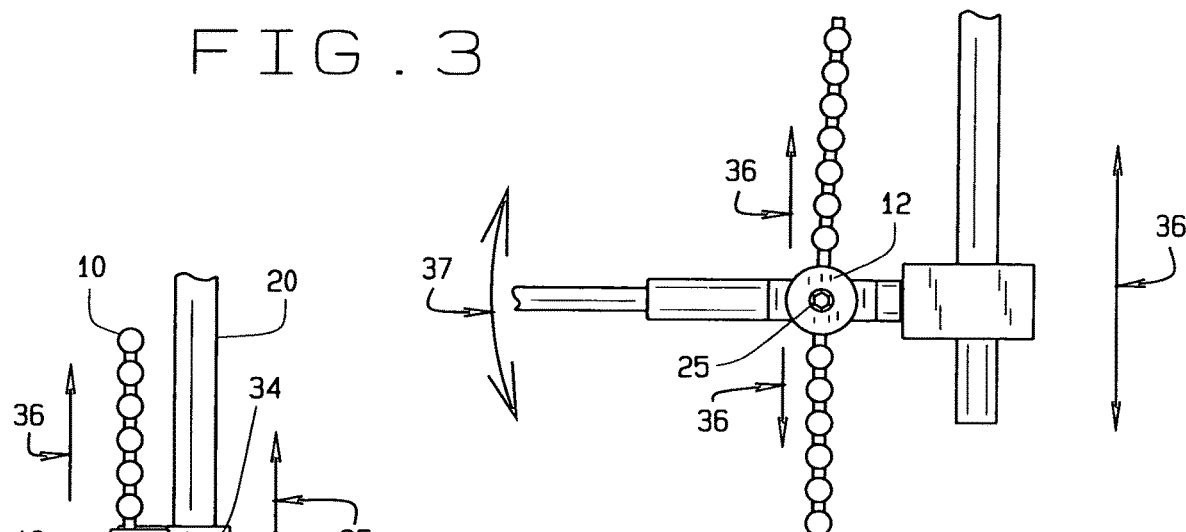
FIG. 4 shows a back view of the interconnecting structures as defined in FIG. 3.
Figure 6:
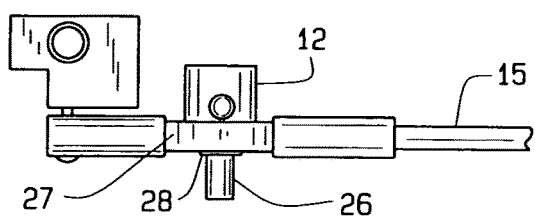
FIG. 6 is a top view of the interconnection of the lateral float arm to the vertical support rod, and the linkage lock pivotally provided upon the said lateral arm.

Connecting with the bottom of the rod 9 is a flexible linkage 10, which in this case, is held into position by means of the securing ring 8, that holds the linkage therein, and which is affixed by its setscrew 24, as can be noted. The bottom end of the flexible linkage 10 secures to a pivot 12, and is held therein by means of a setscrew 25 (FIG. 4). Thus, when the setscrew is loosened, the flexible linkage, which in this case, is shown as a ball type chain, can be pulled therethrough, or pulled upwardly, and affix the adjustment of the various float structural rods, to provide for a precise setting of the float, for installed usage. The opposite side of the pivot 12 has an integral extension 26 (FIG. 6), and which is pivotally applied through the base 27 (FIG. 6) of the lateral arm 15, as can be seen. An E-spring clip 28 (FIG. 6) holds the pivot 12 in place.

The vertical structural support for the float is provided by means of the structure 29 which includes a tube like member 20 that cooperates with a rod 19, and which is secured together by means of the stop 18. Thus, since the rod 19 in the tube 20 are telescopically connected, a simple loosening of the stop 18 can provide for readjustment by way of extension or contraction of the structure 29, in order to be able to set the float precisely at the midpoint of the storage tank in which it is being installed for usage. Hence, when it is installed under these conditions, the indicator 3 will be at the one-half mark of the indicia 21, and the lateral arm 15 will be at the position as shown in FIG. 1. It can also be seen that the lateral arm 15 comprises a tube, and it cooperates with a rod 14, that are secured together in telescopic fashion by means of the stop 30 which provides for adjustment of these components, into the structure of the lateral arm for holding the float 1, as can be noted. If the fuel storage tank is of larger size, the float may be extended, laterally, by loosening of the stop 30, and allowing the tube 15 to slide further outwardly, with respect to its contained rod 14, at which time the stop will be refastened through tightening of its setscrew, into a fixed position. It should also be noted that the lateral arm 15 threadedly engages into a fitting, as at 31, upon the float, to provide for its securement therewith.

The lateral arm 15 also pivotally engages with the vertical structure 29, and this is achieved through the rocker arm 17 as can be noted. The lateral arm 15 is pivotally mounted by means of the pivot pin 32 onto the rocker arm 17, so that it can pivot upwardly, or downwardly, with respect thereto. In addition, as previously explained, the flexible linkage 10 is secured to its pivot 12, as noted. There is a spacing between the pivot point 32, and pivot pin 12, in order to provide for relative movement of the linkage 10, with respect to the vertical structure 29, depending upon the location of the float 1, within the tank, for indicating the level of liquid remaining therein, during usage and application.

Figure 5:
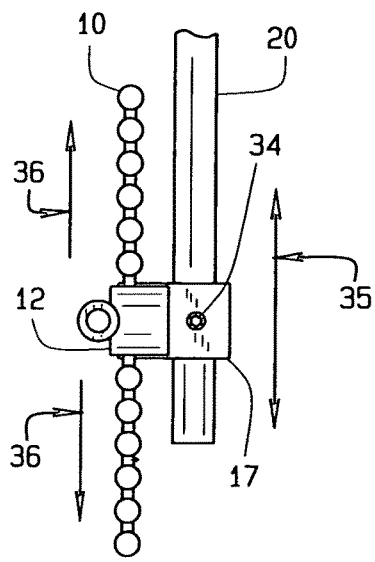
FIG. 5 is a right side view of the interconnection of the lateral float arm to the vertical support rod, and the flexible linkage for the adjustable monitor.

What is distinctive about the current invention is that there are a variety of adjustments and movements that can be made to its various components in order to furnish a more precise setting of the float within the size of storage tank in which it locates, and this can be done in situ by the installer, when assembling the float for usage within a fuel storage tank. Initially, the rod 19 is fixed to the base plate 5a, as noted at 6. For example, as can be noted in FIG. 1, the rod and tube combinations 19 and 20 can be vertically shifted, as noted at 33, simply through the adjustment of its stop 18. In addition, the lower end of the tube 20 is adjustably affixed to its rocker arm 17, and affixed in position by means of a setscrew 34 which can be opened, to allow the rocker to slide upwardly, or downwardly, upon its tube 20, as can be noted at 35. See FIG. 5.

In addition, the flexible linkage 10 as previously explained, can be adjusted for vertical shifting, as noted at 36, by means of adjusting its setscrew 25, as previously explained. In addition, the lateral arm 15, that holds the float 1, is obviously capable of pivoting upwardly or downwardly, as noted at 37, and this particular pivot, to the lateral arm, is significant, because it provides for a clear indication as to the amount of fuel or other liquid remaining within a tank, or when it has been filled to capacity, since it has its affect upon the flexible linkage 10, that can pull the indicator down, or raise it up, depending upon the location of the float 1, within the storage tank, during its application.

Obviously, during installation, the lateral arm 15 and its float 1 will be arranged upwardly, parallel and in close relationship to the vertical structural support 29, so that the entire unit can be slid downwardly through any threaded opening provided in the top of the storage tank, the entire unit can be turned and treaded in place, for its installation. Or, the adaptor 2 can be threaded in place within the top of the storage tank, and then its washer 38, with all of the structures such as the rod 9, the associated rod 19 and tube 20, and lateral arm 15, and its float, can be shifted downwardly through the adaptor until the insert 5 rest upon the washer 38, at which time the housing 4 will be threaded in place, to secure all of these components together, once adjusted, assembled, and inserted into the storage tank, during installation.

Hence, depending upon the amount of fuel that remains within the storage tank, the float 1 will ride upon its surface, and when it is arranged upwardly, at an angle, due to the storage tank being reasonably full, the indicator 3 will rise upwardly within its housing 4, and provide an indication that the fuel tank is full. When the float arrives at the position as shown in FIG. 1, as when it has been adjusted to provide for an indication that the fuel tank is half filled, when it extends horizontally or laterally from the structural support 29, that will provide an indication, through the indicator 3, that the fuel storage tank is half filled, as can be noted for the reading provided in FIG. 1. Then, as the storage tank empties, to provide an indication that refueling should take place, the float will pivot further downwardly, pulling the indicator 3 with it, until such time as the top of the indicator is at the bottom of the indicia 21, indicating that the storage tank is just about empty. For the purpose of adding to the ease of reading of the indicator, it has been recommended that it be in some bright color, such as orange, to make it easier to view relative to the indicia 21, when the homeowner, the building owner, or the supplier of fuel checks the gauge, to determine how much fuel should be added to the fuel tank, during refilling.

It is, though, the essence of this invention to provide for all of these various adjustments as previously noted at 35, 36 and 37, to add to the preciseness for the setting of the monitor, as it is adjusted for installation, depending upon the height and diameter of the fuel tank in which it is to locate, when installed.

Variations or modifications to the subject matter of this invention may occur to those skilled in the art upon review of the disclosure as provided herein. Such variations, if within the spirit of this invention, are intended to be encompassed within the scope of any claims to patent protection issuing hereon. The disclosure of the invention in the specification, and its depiction in the drawings, are set forth for illustrative purposes only.

We claim:

1. An adjustable liquid tank float for use for monitoring a level of liquid in an accompanying storage tank, the storage tank providing upper threaded opening to which the adjustable liquid tank float threadedly connects, the adjustable liquid tank float comprising:

a housing having an indicator within said housing and an indicia on the housing for indicating a position of the indicator within said housing, said housing having a lower threaded end, and the threaded end of said housing provided for engagement with the storage tank;

an adaptor having an upper end, and a threaded insert provided within said adaptor and for use for threadedly engaging with said housing for securing said housing with said storage tank, said adaptor having a lower end, and said lower end of said adaptor being threaded onto the threaded opening of said storage tank, and a base plate provided within said insert, and a washer provided below said insert and beneath said base plate with said insert securing said base plate and washer within the said adaptor;

each said base plate and washer having an opening provided therethrough;

an indicator rod extending through the openings of said base plate and washer and connecting to the underside of the said indicator, and a spring provided upon the base plate, and under the indicator, to bias said indicator into a steady state position during usage, wherein said indicator rod is operatively associated with a float and which upon movement of said float provides an indication of a quantity of liquid contained within the storage tank;

a vertical structure support having a tube and a rod that fits within the tube for telescoping movement of the tube relative to the rod during adjustment, a stop for securing the tube and the rod together when adjusted and to prevent further telescoping movement of the tube relative to the rod when set, the said rod of the vertical structure support connected to the base plate as provided within said adaptor, said vertical structure support capable of adjustment lengthwise when setting up the adjustable liquid tank float for usage;

a horizontal structure support having a lateral arm tube having a first threaded end and a second end, the first threaded end having said float connected thereto, another rod fits within the second end of the lateral arm tube for telescoping movement of the lateral arm tube relative to the another rod during setup, another stop for securing the lateral arm tube and the another rod together to prevent further telescoping movement of the lateral arm tube with respect to the another rod when set, a pivot, and a rocker arm, with a proximate lower end of the tube of the vertical structure support connected to the rocker arm, and the rocker arm connected directly to the another rod of the horizontal structure support;

a flexible linkage having a first end and a second end, the first end of said flexible linkage connected to a bottom of said indicator rod, the indicator rod being connected to the indicator within the housing, the second end of the flexible linkage being connected to the pivot of the lateral arm tube and the another rod, and with the second end of the flexible linkage capable of being adjusted relative to the pivot when initially installed within the storage tank to provide an adjustment to the location of the lateral arm tube and the another rod, and its connected float when setting the initial location of said float within the storage tank when setting up the adjustable liquid tank float for usage; and wherein said horizontal structure support and its connected float capable of pivoting upwardly into proximity with the vertical structure support to provide for their insertion through the threaded opening of the storage tank when setting up the adjustable liquid tank float for usage.

2. The adjustable liquid tank float of claim 1 wherein the storage tank is provided for holding a fuel.

3. The adjustable liquid tank float of claim 2 wherein the fuel is heating oil.

4. The adjustable liquid tank float of claim 1 wherein the flexible linkage is a ball chain.

5. The adjustable liquid level float of claim 1 wherein the pivot comprises an integral extension held in place by an E-spring clip.

6. The adjustable liquid tank float of claim 1 wherein said adaptor and the base plate are formed of polymer.

7. The adjustable liquid tank float of claim 6 wherein said housing is formed of glass.

8. The adjustable liquid level tank of claim 6 wherein said housing is also made of a transparent polymer.

9. The adjustable liquid tank float of claim 1 wherein the pivot comprises an integral extension held in place by a clip.

10. The adjustable liquid tank float of claim 1 wherein the rocker arm further comprises a set screw for securing the rocker arm in place on the tube of the vertical structure support.

* * * * *